United States Patent [19]

Patry

[11] 4,381,028

[45] Apr. 26, 1983

[54] APPARATUS FOR REMOVING A TIRE FROM OR FITTING A TIRE TO A WHEEL-RIM

[76] Inventor: Louison Patry, 393 8th St. West, Thetford Mines Quebec, Canada

[21] Appl. No.: 248,796

[22] Filed: Mar. 30, 1981

[51] Int. Cl.³ .............................................. B60C 25/08
[52] U.S. Cl. ................................................. 157/1.24
[58] Field of Search .................... 157/1.22, 1.24, 1.26, 157/1.28

[56] References Cited

U.S. PATENT DOCUMENTS 2,812,805  11/1957  Athmann .......................... 157/1.28
3,522,832  8/1970  Held et al. ......................... 157/1.22

Primary Examiner—James G. Smith

Attorney, Agent, or Firm—Cushman, Darby & Cushman

[57] ABSTRACT

The apparatus comprises: a stand; a supporting element secured vertically thereto; locking elements mounted upon the supporting element for the purpose of securing the rim thereto; a release-rod adapted to pivot in relation to the supporting element and carrying, at one end, a head adapted to be inserted between the tire and the rim; force-reducing elements mounted rotatably upon the supporting element and upholding the rod, the elements comprising a lever-arm, successive partial rotation of which permits corresponding movements of lesser magnitude of the head of the rod; and locking elements making it possible to maintain a torque element which is stationary in relation to the supporting element during displacement of the release-rod.

13 Claims, 11 Drawing Figures

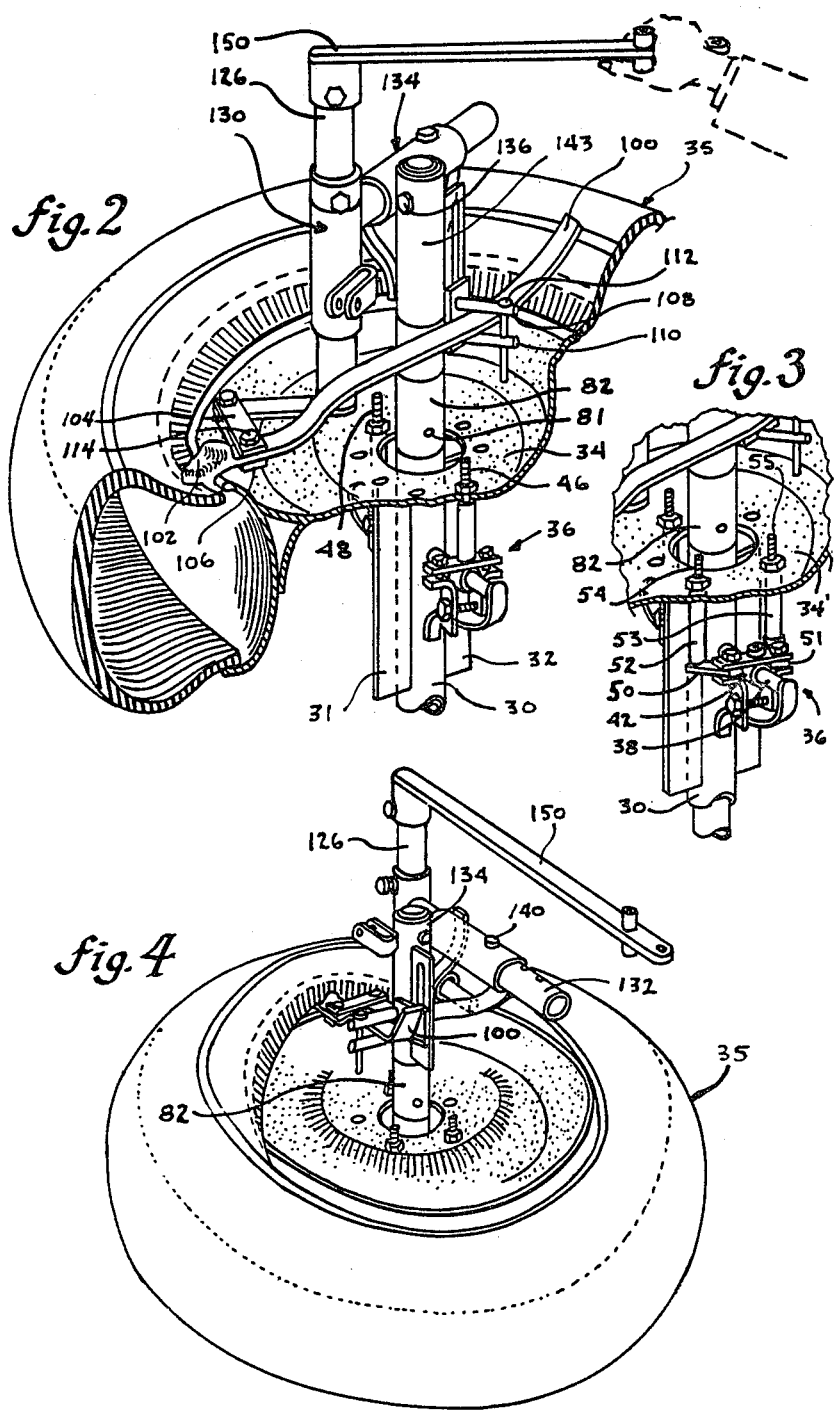

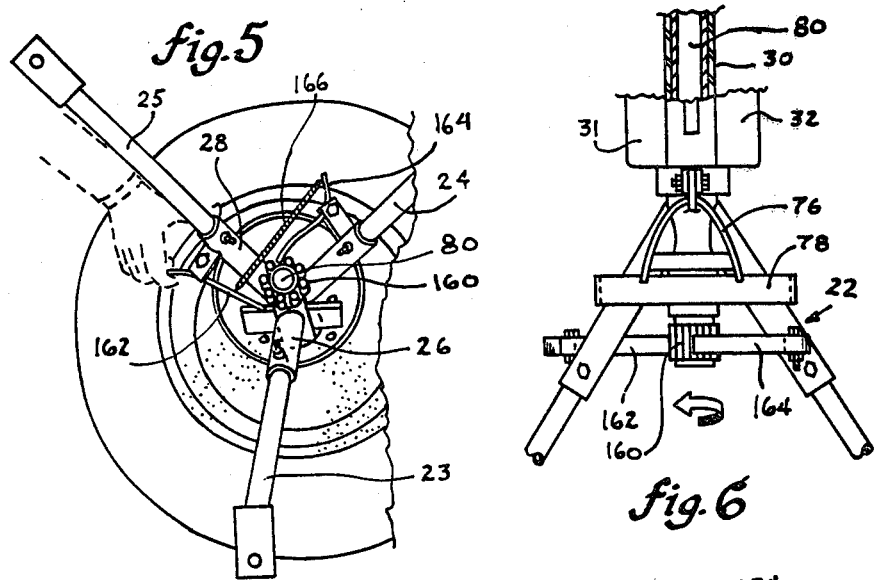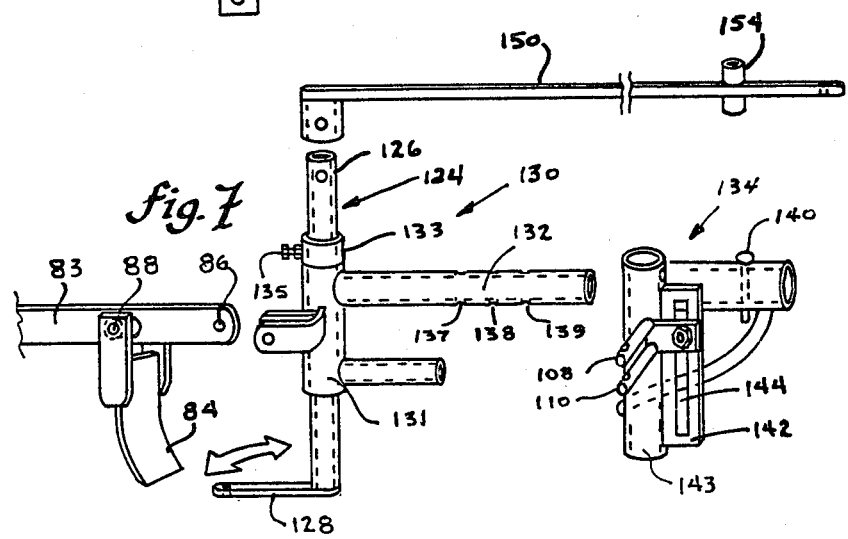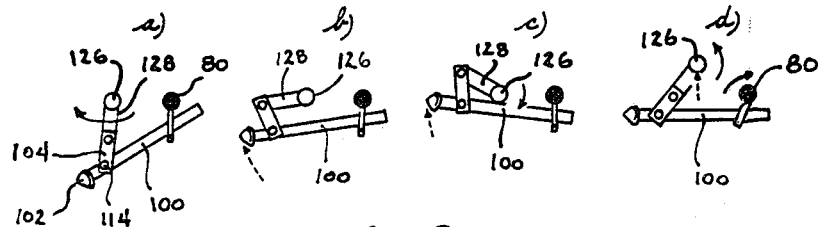

APPARATUS FOR REMOVING A TIRE FROM OR FITTING A TIRE TO A WHEEL-RIM

The present application relates to an apparatus for removing a tire from, or fitting a tire to, a wheel-rim. The apparatus also comprises means for unsticking the tire from the rim prior to removal.

Apparatuses have been developed for the purpose of this invention. However, in view of the considerable effort required to raise the tire over the rim, or to slide it under the peripheral edge thereof, most of the known systems make use of an outside source of power, such as electricity, to provide effective and continuous rotation of the rod between the tire and the rim. The amount of force required, however, means that the apparatus must be fairly large and must be used where such outside power is available.

It is therefore the purpose of the present invention to provide an apparatus which will make it possible for the functions described hereinbefore to be performed by a person without the assistance of outside power. This purpose is achieved by means of an apparatus in which a stepping-down of force is produced between the arm of the lever operated by the user and the rod, the head of which is inserted between the tire and the rim.

The present invention therefore relates to an apparatus adapted to remove a tire from, or fitting a tire to, a wheel-rim, the apparatus comprising: a stand; a supporting element secured vertically and rigidly to the stand; locking means mounted upon the supporting element for the purpose of securing the rim to the supporting element; a release-rod adapted to pivot in relation to the supporting element and carrying, at one end, a head adapted to be inserted between the tire and the rim; means for reducing the force applied, the means being mounted rotatably upon the supporting element and upholding the rod, the force reducing means comprising a lever-arm, a torque-element, one end of which is linked to the lever-arm and the other to the release-rod, successive partial rotation of the lever-arm producing corresponding movements of lesser magnitude of the head of the rod, and locking means making it possible to keep the torque element stationary in relation to the supporting element during displacement of the release-rod.

The present invention also comprises means for unsticking the tire prior to removing it from the rim. These means are mounted to pivot around the supporting element.

Other characteristics and advantages of the invention will emerge from the following description of one example of embodiment of the invention, in conjunction with the drawings attached hereto, wherein:

FIG. 2 is a partial perspective view of the upper part of the apparatus as used to remove or fit a tire;

FIG. 3 is a partial perspective, to an enlarged scale, showing details of the means of securing the rim to the apparatus;

FIG. 4 is a perspective view of the upper part of the apparatus during release of the tire;

FIG. 5 is a view from below along line 5—5 in FIG. 1, showing the lower part of the tire and the locking means;

FIG. 6 is a side elevation along line 6—6 in FIG. 1;

FIG. 7 is an exploded view of the components of the upper part of the apparatus, and FIGS. 8a, b, c, d show the sequence of movements carried out by the release-rod in relation to the lever-elements used in the present apparatus.

Figure 1:
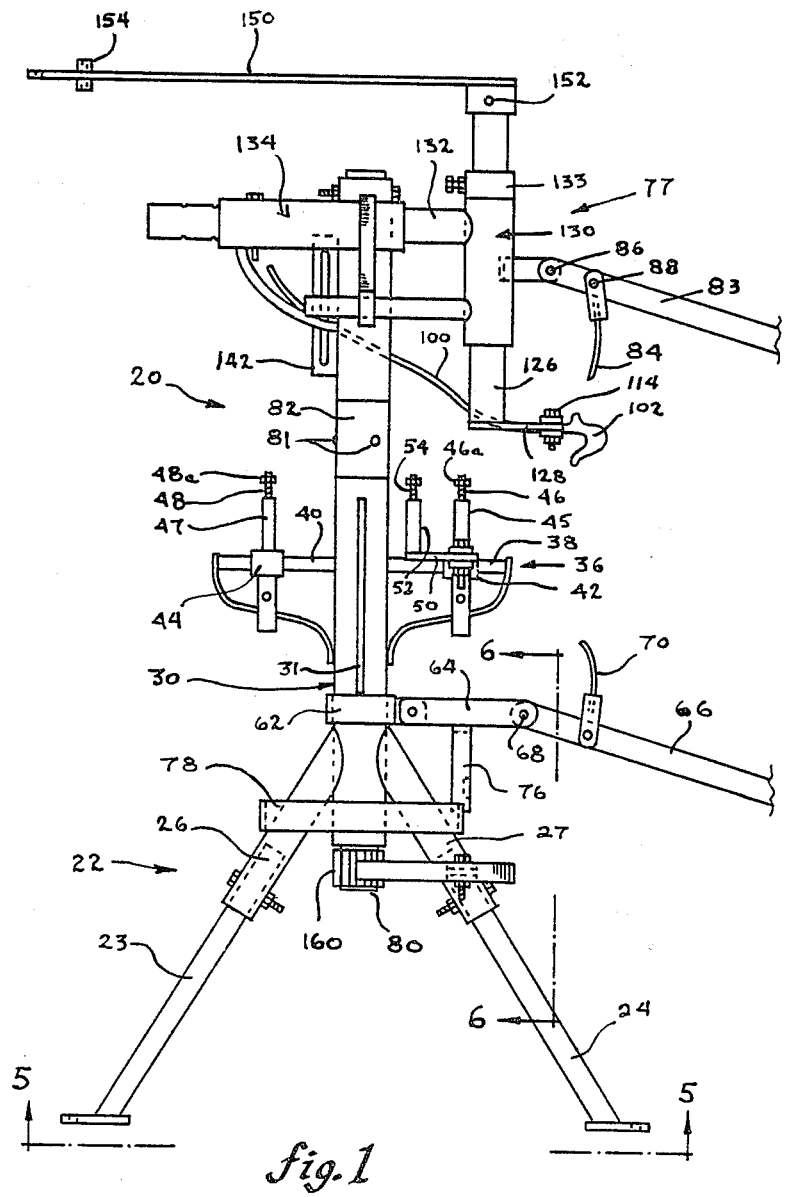
FIG. 1 is a side elevation of the apparatus according to the present invention, carrying the components needed to unstick the tire from the rim and those required to remove or fit the tire.

The apparatus according to the present invention comprises certain parts which are removed or installed depending upon whether the apparatus is being used to unstick the tire from the rim, to remove the tire from the rim, or to fit the tire to the rim. The apparatus illustrated in FIG. 1 carries all of these parts in their respective positions.

Apparatus 20 comprises, in the first place, a tripod 22 having three legs 23,24,25, the upper parts of which are accommodated respectively in cylindrical sleeves 26,27,28, each welded, at its upper end, to a supporting element 30. Two thin rectangular plates 31,32 are welded, diametrically opposite each other, to the outer wall of supporting element 30 which is in the form of a hollow cylindrical body, the plates serving to support the central part 34 carrying a tire 35. Arranged at 90° in relation to plates 31,32, upon the outer surface of cylindrical element 30, are means, marked 36 as a whole, for preventing rim 34 from rotating about element 30 while supported upon the upper edges of plates 31,32. These means 36 consist of a pair of rods 38,30 running radially of the supporting element and carrying sliding elements 42,44 which can be adjusted towards or away from supporting element 30; each adjustable element comprises a tubular member 45,47, the lower part of which is screwed into element 42,44 in such a manner that it may be removed if desired. The upper parts of members 45,47 accommodate bolts 46,48 which pass through holes in rim 34. Nuts 46a, 48a are then fitted to the bolts to secure the rim firmly to supporting element 30.

In FIG. 2, the system is shown for a rim having diametrically-opposite holes, whereas rim 34' in FIG. 3 has three holes arranged at 120° to each other. In FIG. 2, element 45 is replaced by two pivoting arms 50,51 upon which are mounted elements 52,53 resembling element 45 and comprising, in their upper parts, bolts 54,55 which are fitted into the holes in rim 34'.

Mounted pivotably upon the lower part of supporting element 30 is a ring 62 to which is attached a rod 64. An arm 66 pivots about a hinge-point 68 and is fitted with a curved plate 70 used to unstick the tire from the rim. Although this is not indicated, part 64 may have several hinge-points for rims of various diameters. A half-hoop 76 is secured to rod 64, the lower part of the half-hoop bearing upon a ring 78 secured to tripod 22; the ring thus serves as a fulcrum when arm 66 is forced upwardly and plate 70 is forced between the tire and the rim in order to unstick the former from the latter.

Within cylindrical element 30, a shaft 80 is supported by a ring 2 which is, in turn, carried by element 30 and is secured by a set-screw 81. The ring, by bearing upon the upper part of element 30, allows shaft 80 to rotate within it. Shaft 80 projects from the lower part of element 30 and its purpose will be described hereinafter.

The upper part of the apparatus comprises an assembly of components, marked 77 as a whole, required to remove the tire from the rim. This assembly pivots in relation to supporting element 30 and comprises, among other things, a rod 83 (which could also be rod 66 when detached from part 64) with a plate 84 used to release the upper part of the tire from the rim. Rod 83 pivots about axis 86, whereas plate 84 pivots about axis 88.

The second function of apparatus 20 is the removal of the tire from the rim once it has been unstuck. Use is first of all made of a release rod 100 which has a conventional head 102, is slightly curved, and is supported at two locations, i.e. between two brackets 104,106 and a pair of guides 108,110. Rod 100 has a hole close to head 102 for the accommodation of a bolt 114 which holds the rod between brackets 104,106. A pin 112, inserted into parallel guides 108,110, retains rod 100.

Assembly 77 comprises a means for reducing or stepping down the force applied by the operator to rod 100 between the tire and the rim; these means consist, first of all, of an L-shaped torque element 124 (FIG. 7) having a vertical portion 126 and a horizontal portion 128. Vertical portion 126 is carried in a part 130 having a horizontal extension 132 supported in turn in an element 134 connecting it to shaft 80. Element 130 also comprises a hollow vertical part 131 which supports vertical portion 126 by means of a ring 133 and a bolt 135. Horizontal extension 132 comprises a series of apertures 137,138,139 for the accommodation of a pin 140 permitting adjustment of element 130 in relation to the axis of shaft 80. Element 134 also comprises a plate 142 welded to tubular part 143 and fitted with a slot 144 permitting vertical adjustment of guides 108,110 carrying one end of release-rod 100.

A lever arm 150 is secured, with a bolt 152, to the upper part of portion 126. The design of the arm is such that it may replace levers 66 and 83 described hereinbefore and used to unstick the tire; in this case, a small projection 154 accommodates plates of the type shown at 70 and 84.

The lower part of shaft 80 comprises a gear 160 (FIGS. 5 and 6) engaging with two pivotable pawls 162,164 connected together by a spring 166 and mounted upon the legs of tripod 22. The arrangement is such as to allow shaft 80 to rotate in one direction only.

A description will now be given of the operation of removing a tire from a rim with the apparatus according to the invention. As soon as the tire has been unstuck from the two sides of the rim, head 102, on rod 100, is inserted between the tire and the rim in order to lift the tire over the edge of the rim. Rod 100 is placed between guides 104,106 and is secured by inserting pin 114. The other end of rod 100 is then placed between guides 108,110. Locking pin 112 ensures that the tire-release rod remains in place throughout the operation. By moving lever 150 through an arc over a certain distance, a force is applied to vertical and horizontal portions 126,128 of L-shaped torque-element 124. The locking means at the bottom of the apparatus prevent element 124 from rotating about the axis of supporting element 30, since pawls 162,164 are engaged in the gear. On the other hand, torque-element 124 may rotate about its own vertical axis. Referring now to FIG. 8a, rotation of element 128, in a clockwise direction, by means of lever-arm 150, to the position shown in FIG. 8b, will cause head 102 to turn between the tire and the rim until rod 100 makes contact with element 126, as shown in FIG. 8c. It should be noted that, during this rotation, element 126 remains stationary in relation to shaft 80. Once this position has been reached (FIG. 2), rotation of lever 150 in an anti-clockwise direction, in conjunction with the jamming of head 102 between the tire and the rim, will cause element 130 (and 134 and 143) to rotate in relation to the supporting shaft. This rotation is no longer prevented by pawls 162,164, since these slide over the teeth of gear 160 and assume a new locking position. Referring now to FIG. 8d, element 126 moves in relation to shaft 80 and assumes a position, in relation to rod 100, similar to that illustrated in FIG. 8a but displaced through a certain angle. The tire is removed by a sequence of similar operations, with the effort required decreasing as the tire is more and more lifted over the rim.

The same operations are repeated to lift the lower part of the tire over the upper part of the rim. The operations for fitting the tire to the rim are similar.

I claim:

1. An apparatus for removing a tire from, or fitting a tire to, a rim, the apparatus comprising:
   (a) a stand;
   (b) a supporting element secured vertically and rigidly to said stand;
   (c) first locking means mounted upon said supporting element and adapted to hold said rim firmly thereto;
   (d) a release-rod adapted to pivot in relation to said supporting element and carrying, at one end, a head adapted to be inserted between the tire and the rim;
   (e) force reducing means mounted rotatably upon said supporting element and carrying said release-rod; said reducing means comprising a lever-arm, a torque-element with one end connected to said lever-arm and the other to said release-rod; successive partial rotation of said lever-arm permitting corresponding movements, of lesser magnitude, of said head between the tire and the rim;
   (f) second locking means for maintaining said torque-element stationary in relation to said supporting element while the release-rod is being moved between the tire and the rim.

2. An apparatus according to claim 1, wherein said supporting element is a hollow cylindrical body and said second locking means consist of a rotating shaft mounted within said cylindrical body, said rotating shaft being adapted to pivot in relation to said cylindrical body.

3. An apparatus according to claim 2, wherein said torque-element comprises an L-shaped member, the vertical portion of which runs parallel with the axis of said rotating shaft, while the horizontal portion is connected, by a pivoting arrangement, to said release-rod in the vicinity of the head thereof.

4. An apparatus according to claim 3, comprising connecting means uniting the L-shaped element to said rotating shaft.

5. An apparatus according to claim 4, wherein said connecting means comprise a means of adjustment to thereby vary the height of said rod in relation to the rim.

6. An apparatus according to claim 4, wherein said connecting means comprise further means of adjustment to vary the setting of the L-shaped element for rims of various diameters.

7. An apparatus according to claim 4, wherein said connecting means comprise means for the attachment of a bar used to unstick the upper part of the tire from the rim.

8. An apparatus according to claim 2, wherein said second locking means consist of a gear secured to the bottom of said rotating shaft, and ratchet means mounted upon said stand and engaging with said gear.

9. An apparatus according to claim 8, wherein said ratchet means, mounted upon said stand, comprises two pawls connected together by a spring serving to keep said pawls in constant contact with said gear.

10. An apparatus according to claim 1, wherein said first locking means comprise supporting elements mounted externally of said supporting element and serving to support the rim; and means, radially adjustable in relation to said supporting element, adapted to accommodate various arrangement of holes in the wheel and to prevent the rim from rotating in relation to said supporting element.

11. An apparatus according to claim 1, comprising release elements adapted to pivot about said supporting element and serving to unstick the lower part of the tire from the rim.

12. An apparatus according to claim 11, comprising a ring secured to said support and serving as a point of support for said release elements while the tire is being unstuck from the rim.

13. An apparatus according to claim 1, 7 or 11, wherein the lever-arm is detachable and is designed to serve as a means of release for unsticking the tire from the rim.

* * * * *